US012713107B2

(12) United States Patent
Gong et al.

(10) Patent No.: US 12,713,107 B2
(45) Date of Patent: Aug. 18, 2026

(54) MUSIC POINT-BASED VIDEO GENERATION METHOD AND APPARATUS, DEVICE, AND STORAGE MEDIUM

(71) Applicant: Lemon Inc., Grand Cayman (KY)

(72) Inventors: Weibo Gong, Beijing (CN); Xiaojie Jin, Los Angeles, CA (US); Xiaohui Shen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 131 days.

(21) Appl. No.: 18/723,804

(22) PCT Filed: Dec. 15, 2022

(86) PCT No.: PCT/SG2022/050906
§ 371 (c)(1),
(2) Date: Jun. 24, 2024

(87) PCT Pub. No.: WO2023/121562
PCT Pub. Date: Jun. 29, 2023

(65) Prior Publication Data

US 2025/0071390 A1 Feb. 27, 2025

(30) Foreign Application Priority Data

Dec. 24, 2021 (CN) ......................... 202111602771.4

(51) Int. Cl.
*H04N 21/81* (2011.01)
*G10H 1/00* (2006.01)
(Continued)

(52) U.S. Cl.
CPC ....... *H04N 21/8113* (2013.01); *G10H 1/0008* (2013.01); *H04N 21/439* (2013.01); *H04N 21/44* (2013.01); *G10H 2210/076* (2013.01)

(58) Field of Classification Search
CPC .. H04N 21/8113; H04N 21/439; H04N 21/44; H04N 21/81; H04N 21/816; G10H 1/0008; G10H 2210/076; G10H 1/40
(Continued)

(56) References Cited

U.S. PATENT DOCUMENTS 6,850,284 B2 * 2/2005 Gries ....................... H04N 5/04 348/E5.009
6,998,527 B2 * 2/2006 Agnihotri ............. G06F 16/739 84/649

(Continued)

FOREIGN PATENT DOCUMENTS

CN 104202540 A 12/2014
CN 107124624 A 9/2017

(Continued)

OTHER PUBLICATIONS

China Patent Application No. 202111602771.4; Office Action; dated May 1, 2025; 16 pages.

(Continued)

*Primary Examiner* — Helen Shibru
(74) *Attorney, Agent, or Firm* — BakerHostetler

(57) ABSTRACT

The present disclosure provides a video generation method based on music beats, a video generation apparatus based on music beats, an electronic device and a computer-readable storage medium. The method includes: acquiring a plurality of video objects and audio information respectively; determining a plurality of initial music beats in the audio information and characteristic information of each initial music beat, in which the characteristic information at least includes a sound intensity of each initial music beat and time of each initial music beat in the audio information; according to the characteristic information, selecting a target music beat from the plurality of initial music beats; and generating a target
(Continued)

video according to the target music beat and the plurality of video objects.

20 Claims, 4 Drawing Sheets

(51) Int. Cl.
*H04N 21/439* (2011.01)
*H04N 21/44* (2011.01)

(58) Field of Classification Search
USPC .......................................................... 386/280
See application file for complete search history.

(56) References Cited

U.S. PATENT DOCUMENTS 7,069,208 B2 * 6/2006 Wang ................... G10H 1/0058 704/211
8,626,322 B2 * 1/2014 Weber .................... G11B 27/34 381/103
11,323,814 B2 * 5/2022 Yoo ........................ H04R 5/023
11,642,698 B2 * 5/2023 Yoo ......................... B06B 1/161 181/207
11,763,849 B1 * 9/2023 Ouyang ............... G11B 27/031 386/285
2023/0082086 A1 * 3/2023 Echeveste .............. G10H 1/361 84/636
2025/0056084 A1 * 2/2025 Jin ..................... H04N 21/4312
2025/0061870 A1 * 2/2025 Rui ...................... G10H 1/0008
2025/0097545 A1 * 3/2025 Gong ...................... G06T 13/00

FOREIGN PATENT DOCUMENTS

| | | | | |
|---|---|---|---|---|
| CN | 110797055 | * | 2/2020 | ........... G11B 27/031 |
| CN | 110797055 | A | 2/2020 | |
| CN | 110933487 | A | 3/2020 | |
| CN | 111835986 | A | 10/2020 | |
| CN | 112235631 | A | 1/2021 | |
| CN | 113179448 | A | 7/2021 | |
| CN | 113497970 | A | 10/2021 | |
| WO | WO 2017/113973 | A1 | 7/2017 | |

OTHER PUBLICATIONS

International Patent Application No. PCT/SG2022/050906; Int'l Written Opinion and Search Report; dated Aug. 21, 2023; 8 pages.

* cited by examiner

MUSIC POINT-BASED VIDEO GENERATION METHOD AND APPARATUS, DEVICE, AND STORAGE MEDIUM

CROSS-REFERENCE TO RELATED APPLICATION

The present disclosure is a national phase of International Patent Application No. PCT/SG2022/050906, filed on Dec. 15, 2022, which claims the priority of China patent application with application number of 202111602771.4, filed on Dec. 24, 2021, and the application name is "Music point-based video generation method and apparatus, device, and storage medium", the entire contents of which are incorporated into the present disclosure by reference.

TECHNICAL FIELD

The present disclosure relates to the technical field of Internet, in particular to a video generation method and apparatus based on music beats, an electronic device, a storage medium, a computer program product and a computer program.

BACKGROUND

Playing multiple images and matching the multiple images with a piece of music can form a video. At present, in order to increase the richness of the video, when playing to the preset music beat, the rendering effect can be added to the image.

In the related art, the following methods are usually used to get preset music beats: in the process of playing music, users set their favorite music beats as the preset music beats, the preset music beats have strong user tolerance, and usually only are downbeat beats, so that the preset music beats are simple and the richness of the video are poor, and the rendering effect added to the video at manually selected music beats may not match the overall effect of the video, thereby resulting in poor quality of the generated video.

SUMMARY

The present disclosure provides a video generation method and apparatus based on music beats, an electronic device, a storage medium, a computer program product and a computer program, which are used for solving the problem that the video is poor in richness and the rendering effect added to the video at a manually selected music beat may not match the overall effect of the video, so that the generated video is poor in quality.

In a first aspect, the present disclosure provides a video generation method based on music beats, including:

- acquiring a plurality of video objects and audio information respectively;
- determining a plurality of initial music beats in the audio information and characteristic information of each initial music beat, wherein the characteristic information at least comprises a sound intensity of each initial music beat and time of each initial music beat in the audio information;
- according to the characteristic information, selecting a target music beat from the plurality of initial music beats; and
- generating a target video according to the target music beat and the plurality of video objects.

In some embodiments, the according to the characteristic information, selecting a target music beat from the plurality of initial music beats comprises: judging whether the sound intensity of each initial music beat is greater than a first preset value; determining the target music beat according to a first music beat whose sound intensity is greater than the first preset value.

In some embodiments, the determining the target music beat according to a first music beat whose sound intensity is greater than the first preset value comprises: aim at any two adjacent first music beats, acquiring a first duration between the two adjacent first music beats according to time corresponding to the first music beat; if the first duration is less than a first preset duration, deleting a first music beat with a low priority among the two adjacent first music beats to obtain remaining at least two second music beats; and determining the target music beat according to the at least two second music beats.

In some embodiments, the plurality of initial music beats comprise at least two music beats of the following: a downbeat beat, a voice beat, a music phrase beat, a music paragraph beat, a sound effect beat and a chorus beat.

In some embodiments, the deleting a first music beat with a low priority among the two adjacent first music beats comprises: according to a preset priority order, deleting the first music beat with the low priority among the two adjacent first music beats; the preset priority order from top to bottom is a chorus beat, a strong sound beat, a music phrase beat, a music paragraph beat, a downbeat beat, a weak sound beat, a voice beat and a preset beat.

In some embodiments, the according to the characteristic information, selecting a target music beat from the plurality of initial music beats comprises: determining a target score of each initial music beat according to the time of each initial music beat in the audio information; and determining the target music beat according to the target score of each initial music beat.

In some embodiments, the determining the target music beat according to the target score of each initial music beat comprises: deleting an initial music beat with the target score less than a second preset value to obtain a remaining third music beat; and according to time of the third music beat in the audio information, determining a target score of each third music beat again, and determining the target music beat according to the target score of the third music beat.

In some embodiments, the determining a target score of each initial music beat according to the time of each initial music beat in the audio information comprises: determining a second duration between two adjacent initial music beats according to the time of each initial music beat in the audio information, and determining a first score of each initial music beat according to the second duration; determining a second score of each initial music beat according to a weight of each initial music beat; determining a third score of each initial music beat according to the time of each initial music beat in the audio information and starting time and ending time of the audio information; determining the target score of each initial music beat according to the first score, the second score and the third score.

In some embodiments, the determining a first score of each initial music beat according to the second duration comprises: determining a third duration according to a total duration of the audio information and a number of the plurality of video objects; determining an absolute value of a difference between the second duration and the third duration as the first score.

In some embodiments, the determining a third score of each initial music beat according to the time of each initial music beat in the audio information and starting time and ending time of the audio information comprises: determining a fourth score according to the time of each initial music beat in the audio information, the starting time of the audio information and a second preset duration; determining a fifth score according to the time of each initial music beat in the audio information, the ending time of the audio information and the second preset duration; determining the third score according to the fourth score and the fifth score.

In some embodiments, the method further comprises: according to a preset priority order, setting a corresponding weight for each initial music beat; the weight is at least partially related to a priority of the music beat.

In some embodiments, generating a target video according to the target music beat and the plurality of video objects comprises: adding the audio information to an audio track of the plurality of video objects to obtain a video to be processed; in the video to be processed, adding a rendering effect to a video object corresponding to time where the target music beat is located to obtain the target video, wherein the rendering effect is an animation, an effect or a transition.

In some embodiments, the determining a plurality of initial music beats in the audio information and characteristic information of each initial music beat comprises: inputting the audio information into an audio characteristic analysis model to obtain the plurality of initial music beats in the audio information and the characteristic information of each initial music beat.

In a second aspect, the present disclosure further provides a video generation apparatus based on music beats, comprising: a processing module; the processing module is configured to:

- acquire a plurality of video objects and audio information respectively;
- determine a plurality of initial music beats in the audio information and characteristic information of each initial music beat, wherein the characteristic information at least comprises a sound intensity of each initial music beat and time of each initial music beat in the audio information;
- according to the characteristic information, select a target music beat from the plurality of initial music beats;
- and generate a target video according to the target music beat and the plurality of video objects.

In some embodiments, the processing module is specifically used for: judging whether the sound intensity of each initial music beat is greater than a first preset value; determining the target music beat according to a first music beat whose sound intensity is greater than the first preset value.

In some embodiments, the processing module is specifically used for: for any two adjacent first music beats, acquiring a first duration between the two adjacent first music beats according to time corresponding to the first music beat; if the first duration is less than a first preset duration, deleting a first music beat with a low priority among the two adjacent first music beats to obtain remaining at least two second music beats; and determining the target music beat according to the at least two second music beats.

In some embodiments, the plurality of initial music beats comprise at least two music beats of the following: a downbeat beat, a voice beat, a music phrase beat, a music paragraph beat, a sound effect beat and a chorus beat.

In some embodiments, the deleting a first music beat with a low priority among the two adjacent first music beats comprises: according to a preset priority order, deleting the first music beat with the low priority among the two adjacent first music beats; the preset priority order from top to bottom is a chorus beat, a strong sound beat, a music phrase beat, a music paragraph beat, a downbeat beat, a weak sound beat, a voice beat and a preset beat.

In some embodiments, the processing module is specifically used for: determining a target score of each initial music beat according to the time of each initial music beat in the audio information; and determining the target music beat according to the target score of each initial music beat.

In some embodiments, the processing module is specifically used for: deleting an initial music beat with the target score less than a second preset value to obtain a remaining third music beat; and according to time of the third music beat in the audio information, determining a target score of each third music beat again, and determining the target music beat according to the target score of the third music beat.

In some embodiments, the processing module is specifically used for: determining a second duration between two adjacent initial music beats according to the time of each initial music beat in the audio information, and determining a first score of each initial music beat according to the second duration; determining a second score of each initial music beat according to a weight of each initial music beat; determining a third score of each initial music beat according to the time of each initial music beat in the audio information and starting time and ending time of the audio information; determining the target score of each initial music beat according to the first score, the second score and the third score.

In some embodiments, the processing module is specifically used for: determining a third duration according to a total duration of the audio information and a number of the plurality of video objects; determining an absolute value of a difference between the second duration and the third duration as the first score.

In some embodiments, the processing module is specifically used for: determining a fourth score according to the time of each initial music beat in the audio information, the starting time of the audio information and a second preset duration; determining a fifth score according to the time of each initial music beat in the audio information, the ending time of the audio information and the second preset duration; determining the third score according to the fourth score and the fifth score.

In some embodiments, the processing module is specifically used for: according to a preset priority order, setting a corresponding weight for each initial music beat; the weight is at least partially related to a priority of the music beat.

In some embodiments, the processing module is specifically used for: adding the audio information to an audio track of the plurality of video objects to obtain a video to be processed; in the video to be processed, adding a rendering effect to a video object corresponding to time where the target music beat is located to obtain the target video, wherein the rendering effect is an animation, an effect or a transition.

In some embodiments, the processing module is specifically used for: inputting the audio information into an audio characteristic analysis model to obtain the plurality of initial music beats in the audio information and the characteristic information of each initial music beat.

In a third aspect, the present disclosure further provides an electronic device, comprising: a processor and a memory communicatively connected to the processor;

computer-executable instructions are stored on the memory;

when the computer-executable instructions stored in the memory are executed by the processor, the method described in any one of the first aspects is realized.

In a fourth aspect, the present disclosure further provides a computer-readable storage medium, storing computer-executable instructions thereon, wherein the computer-executable instructions, when executed by a processor, realizes the method described in any one of the first aspects.

In a fifth aspect, the present disclosure further provides a computer program product, comprising a computer program, wherein the computer program, when executed by a processor, implements the method described in any one of the first aspects.

In a sixth aspect, the present disclosure further provides a computer program, wherein the computer program, when executed by a processor, implements the method described in any one of the first aspects.

The present disclosure provides a video generation method and apparatus based on music beats, an electronic device, a storage medium, a computer program product and a computer program. The method comprises: acquiring a plurality of video objects and audio information respectively; determining a plurality of initial music beats in the audio information and characteristic information of each initial music beat, wherein the characteristic information at least comprises a sound intensity of each initial music beat and time of each initial music beat in the audio information; according to the characteristic information, selecting a target music beat from the plurality of initial music beats; and generating a target video according to the target music beat and the plurality of video objects. In the above method, according to the characteristic information of each initial music beat, the target music beat is selected from the plurality of initial music beats, so that the time where the target music beat is located is the most suitable time to increase the rendering effect. Further, the target video is generated according to the target music beat and the plurality of video objects, which can prevent users from setting their favorite music beats as the preset music beats, thereby improving the richness of the target video and the quality of the generated target video.

BRIEF DESCRIPTION OF DRAWINGS

The accompanying drawings, which are incorporated in and constitute a part of the present specification, illustrate embodiments consistent with the present disclosure and together with the description, serve to explain the principles of the present disclosure.

Through the above drawings, clear embodiments of the present disclosure have been shown, which will be described in more detail later. These drawings and written descriptions are not intended to limit the scope of the disclosed concepts in any way, but to explain the disclosed concepts to those skilled in the art by referring to specific embodiments.

DETAILED DESCRIPTION

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. Rather, they are merely examples of apparatus and methods consistent with some aspects of the present disclosure as detailed in the appended claims.

Firstly, the related technologies are explained.

In the related art, in order to increase the richness of a video, users set their favorite music beats as preset music beats in the process of playing a music, and when the music is played to the preset music beats, rendering effects are added to an image. In the above related technologies, users set their favorite music beats as the preset music beats, resulting in poor video richness.

In the present disclosure, in order to improve the richness of the video, the inventor thought of screening out the target music beat from a plurality of initial music beats according to their characteristic information, and then generating a target video according to the target music beat and a plurality of video objects, so as to prevent users from setting their favorite music beats as the preset music beats, thereby improving the richness of the video.

Next, the application scenario of the video generation method based on music beats provided by the present disclosure will be described with reference to FIG. 1. For details, please refer to FIG. 1.

Figure 1:
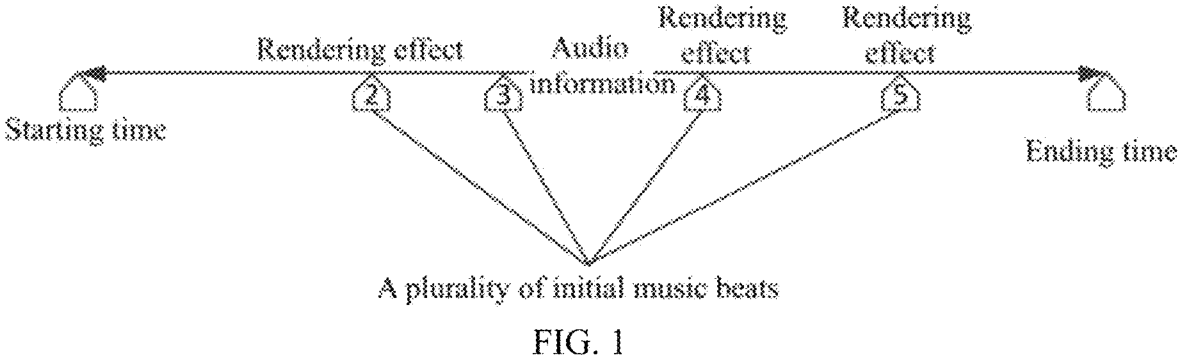
FIG. 1 is a schematic diagram of an application scenario provided by the present disclosure.

FIG. 1 is a schematic diagram of an application scenario provided by the present disclosure. As shown in FIG. 1, audio information includes a plurality of initial music beats. For example, the plurality of initial music beats include: initial music beats 2 to 5.

In the present disclosure, the target music beat can be selected from the plurality of initial music beats. For example, the target music beats 2, 4 and 5 are selected from the initial music beats 2 to 5.

Further, after the target music beat is selected, a rendering effect is added to the video object corresponding to the time where the target music beat is located to obtain the target video, thereby improving the richness of the target video.

The technical scheme of the present disclosure and how the technical scheme of the present disclosure can solve the above technical problems will be described in detail with specific examples. The following specific embodiments can be combined with each other, and the same or similar concepts or processes may not be repeated in some embodiments. Embodiments of the present disclosure will be described below with reference to the accompanying drawings.

Figure 2:
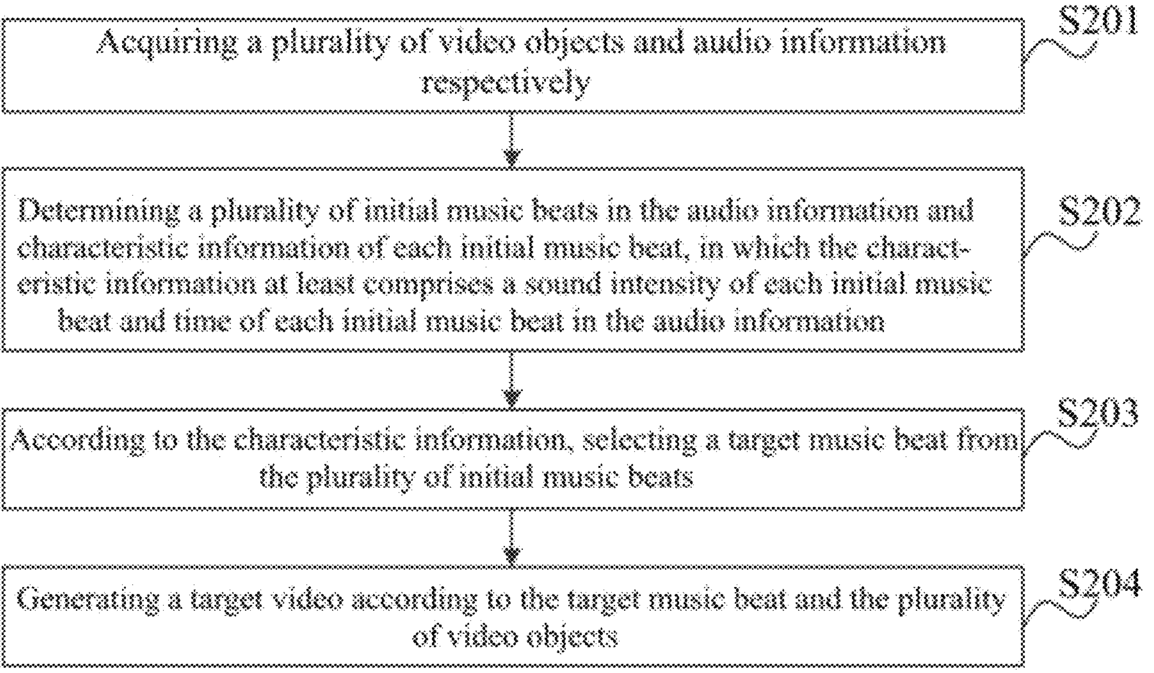
FIG. 2 is a flowchart of a video generation method based on music beats provided by the present disclosure.

FIG. 2 is a flowchart of a video generation method based on music beats provided by the present disclosure. As shown in FIG. 2, the method includes:

S201: acquiring a plurality of video objects and audio information respectively.

Optionally, the execution subject for executing the video generation method based on music beats can be an electronic device or a video generation apparatus based on the music beats arranged in the electronic device.

The electronic device can be a wireless terminal or a wired terminal. The wireless terminal may be a device that provides voice and/or other business data connectivity to users, a handheld device with wireless connection function, or other processing devices connected to a wireless modem. The wireless terminal can communicate with one or more core network devices via a Radio Access Network (RAN). The wireless terminal can be a mobile terminal, such as a mobile phone (or called as a "cellular" phone) and a computer with a mobile terminal, for example, the mobile terminal is a portable, pocket-sized, handheld, computer-built or vehicle-mounted mobile device, which exchange languages and/or data with wireless access networks. For another example, the wireless terminal can also be a Personal Communication Service (PCS) phone, a cordless phone, a Session Initiation Protocol (SIP) phone, a Personal Digital Assistant (PDA) and other devices. The wireless terminal can also be called a Remote Terminal, an Access Terminal, a User Terminal, a User Agent, and a User Device or User Equipment, and is not limited herein. Optionally, the electronic device can also be a smart watch, a tablet computer and other devices. The wired terminal can be a desktop computer, camera equipment, etc.

The video generation apparatus can be realized by a combination of software and/or hardware. The video generation apparatus includes, but are not limited to, a short video application program.

The plurality of video objects can include multiple images, multiple videos, and also can include at least one image and at least one video.

Optionally, the plurality of video objects are determined by the electronic device according to the user's selection operation on the plurality of video objects among N video objects, wherein N is an integer greater than or equal to 2. Optionally, the plurality of video objects are objects pre-stored in the electronic device.

Optionally, the audio information is determined by the electronic device according to the user's selection operation of one of plurality of audio information.

Optionally, the audio information can also be audio information matched with the plurality of video objects obtained after analyzing and processing the plurality of video objects and the plurality of audio information through a music matching model.

S202: determining a plurality of initial music beats in the audio information and characteristic information of each initial music beat, in which the characteristic information at least comprises a sound intensity of each initial music beat and time (i.e., time stamp) of each initial music beat in the audio information.

The S202 specifically includes inputting the audio information into an audio characteristic analysis model to obtain the plurality of initial music beats in the audio information and the characteristic information of each initial music beat.

The audio characteristic analysis model can be a beat tracking model based on deep learning or a music onset model based on a short-term spectrum analysis.

The plurality of initial music beats include at least two music beats of the following: a downbeat beat, a voice beat, a music phrase beat, a music paragraph beat, a sound effect beat, a chorus beat and the like.

S203: according to the characteristic information, selecting a target music beat from the plurality of initial music beats.

Optionally, the target music beat may include at least one music beat among a downbeat beat, a voice beat, a music phrase beat, a music paragraph beat, a sound effect beat and a chorus beat.

Optionally, the target music beat can be selected by the following two ways (a way 11 and a way 12).

In the way 11, The S203 specifically includes: judging whether the sound intensity of each initial music beat is greater than a first preset value; and determining the target music beat according to a first music beat whose sound intensity is greater than the first preset value.

Optionally, the target music beat can be determined according to the first music beat whose sound intensity is greater than the first preset value in the following two ways (a way 111 and a way 112).

In the way 111, the first music beat with a sound intensity greater than a first preset value is determined as the target music beat.

In the way 112: for any two adjacent first music beats, acquiring a first duration between the two adjacent first music beats according to time corresponding to the first music beat; if the first duration is less than a first preset duration, deleting a first music beat with a low priority among the two adjacent first music beats to obtain remaining at least two second music beats; and determining the target music beat according to the at least two second music beats.

The first duration is a first duration corresponding to a previous first music beat in two adjacent first music beats.

For example, when the first music beat includes a music beat 1 and a music beat 2, the music beat 1 (the previous first music beat) and the music beat 2 (the latter first music beat) have a first duration corresponding to the music beat 1.

Optionally, the first duration is equal to a difference between the time corresponding to the next first music beat and the time corresponding to the previous first music beat. For example, the time corresponding to the last first music beat is greater than the time corresponding to the previous first music beat. For example, the first duration is equal to a difference between the time corresponding to the music beat 2 and the time corresponding to the music beat 1.

In some embodiments, the deleting the first music beat with a low priority in two adjacent first music beats includes deleting the first music beat with the low priority in two adjacent first music beats according to a preset priority order.

For example, the preset priority order from high to bottom is: a chorus beat, a strong sound beat, a music phrase beat, a music paragraph beat, a downbeat beat, a weak sound beat, a voice beat and a preset beat (that is, other beats). That is, the chorus beat>the strong sound beat>the music phrase beat>the music paragraph beat>the downbeat beat>the weak sound beat>the voice beat>the preset beat.

Optionally, the priority of the music phrase beat and the priority of the music paragraph beat can also be the same. It should be noted that the strong sound t beat is a music beat with a strong sound intensity, and a weak sound effect beat is a music beat with a weak sound intensity.

For example, when two adjacent first music beats include the music phrase beat and the downbeat beat, the downbeat beat is deleted according to the preset priority order to obtain the music phrase beat, and the music phrase beat is determined as the target music beat.

In the way 12, The S203 specifically includes: determining a target score of each initial music beat according to the time of each initial music beat in the audio information; and determining the target music beat according to the target score of each initial music beat. For the explanation of determining the target music beat according to the target score of each initial music beat, please refer to the embodiment of FIG. 3.

S204: generating a target video according to the target music beat and the plurality of video objects.

In some embodiments, the S204 specifically includes: adding the audio information to an audio track of the plurality of video objects to obtain a video to be processed; in the video to be processed, adding a rendering effect to a video object corresponding to time where the target music beat is located to obtain the target video, wherein the rendering effect is an animation, an effect or a transition.

For example, the audio track of the plurality of video objects are a time axe for sequentially playing the plurality of video objects.

For example, when the target music beat is a downbeat beat and the rendering effect is the animation (or the effect), the animation (or the effect) is added to the video object corresponding to the time where the downbeat beat is located.

In the video generation method based on music beats provided in the embodiment of FIG. 2, the target music beat is selected from the plurality of initial music beats according to the characteristic information of each initial music beat, so that the time where the target music beat is located is the most suitable time to increase the rendering effect. Further, according to the target music beat and the plurality of video objects, the target video is generated, which can prevent users from setting their favorite music beats as the preset music beats, thus improving the richness of the target video.

In the prior art, when the users set their favorite music beat as the preset music beat, the preset music beat is usually only the downbeat beat, so that the preset music beat is relatively simple and the richness of the target video is poor. However, in the present disclosure, the plurality of initial music beats include at least two music beats of the downbeat beat, the voice beat, the music phrase beat, the music paragraph beat, the sound effect beat and the chorus beat, and the target music beat is selected from the plurality of initial music beats, so that the target music beat can include the downbeat beat, the voice beat, the music phrase beat, the music paragraph beat, the sound effect beat and the chorus beat and the like, which increases the diversity of the target music beats, thereby improving the richness of the target video.

Figure 3:
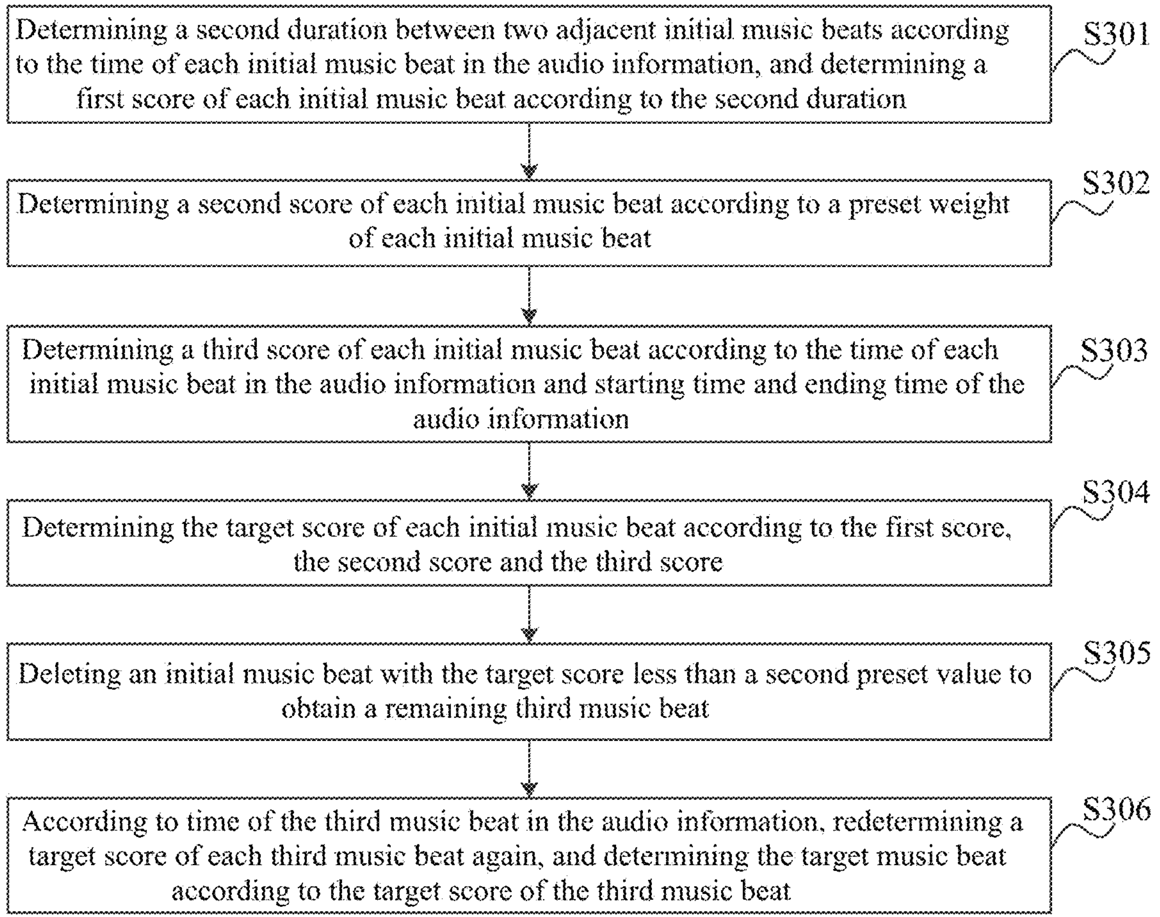
FIG. 3 is a first flowchart of a method for determining a target music beat provided by the present disclosure.

On the basis of the above embodiment, the present disclosure also provides a method for determining the target music starting beat, please refer to the embodiment of FIG. 3.

FIG. 3 is a flowchart of a method for determining a target music beat provided by the present disclosure. As shown in FIG. 3, the method includes:

S301: determining a second duration between two adjacent initial music beats according to the time of each initial music beat in the audio information, and determining a first score of each initial music beat according to the second duration.

It should be noted that each initial music beat has its own corresponding second duration.

Optionally, the second duration between two adjacent initial music beats is determined according to the following Equation 1:

$$D\_i = D_{i+1} - D_i; \quad \text{Equation 1}$$

where, D_i is the second duration corresponding to the previous initial music beat ($S_i$) in two adjacent initial music beats, $D_i$ is the time of the previous initial music beat in the audio information, and $D_{i+1}$ is the time of the last initial music beat ($S_{i+1}$) of two adjacent initial music beats in the audio information, and $D_{i+1}$ is usually greater than $D_i$.

In some embodiments, determining the first score of each initial music beat according to the second duration includes determining a third duration according to a total duration of the audio information and a number of the plurality of video objects; and determining an absolute value of a difference between the second duration and the third duration as the first score.

Optionally, the third duration D_avg may be the ratio of the total duration of audio information to the number of video objects. For example, if the total duration is T and the number of video objects is M, the ratio is equal to T/M. Optionally, M may be an integer greater than or equal to 2.

Optionally, the first score corresponding to the initial music beat ($S_i$) can be determined by the following Equation 2:

$$cost\_d = |D\_i - D\_avg|; \quad \text{Equation 2}$$

where, Cost_d is the first score.

S302: determining a second score of each initial music beat according to a preset weight of each initial music beat.

In some embodiments, according to the preset priority order, corresponding weights are set for each initial music beat, and the weights are at least partially related to the priorities of the music beats.

In some embodiments, the weight of each initial music beat can be manually adjusted according to the requirements of the business scene.

In some embodiments, for each initial music beat, the weight of the initial music beat is determined as the second score of the initial music beat (denoted as Cost_s).

S303: determining a third score of each initial music beat according to the time of each initial music beat in the audio information and starting time and ending time of the audio information.

In some embodiments, the S303 specifically includes: determining a fourth score according to the time of each initial music beat in the audio information, the starting time of the audio information and a second preset duration; determining a fifth score according to the time of each initial music beat in the audio information, the ending time of the audio information and the second preset duration; determining the third score according to the fourth score and the fifth score.

For example, each initial music beat has the fourth score, the fifth score and the third score corresponding to the initial music beat.

In some embodiments, the fourth score can be obtained by the following Equation 3:

$$cost\_t1 = \max(t\_start + t\_shortest - t\_k, 0); \quad \text{Equation 3}$$

where cost_t1 is the fourth score of the initial music beat, max is the maximum operation, t_start is the starting time of the audio information, t_shortest is the second preset duration, and t_k is the time of the initial music beat in the audio information.

In some embodiments, the fifth score can be obtained by the following Equation 4:

$$cost\_t2 = \max(t\_k - t\_end - t\_shortest, 0); \quad \text{Equation 4}$$

where cost_t2 is the fifth score of the initial music beat and t_end is the ending time of the audio information.

In some embodiments, the third score can be obtained by the following Equation 5:

$$Cost\_p = cost\_t1 + cost\_t2; \quad \text{Equation 5}$$

where Cost_p is the third score.

Optionally, the third score can be determined according to the fourth score and the fifth score through other algorithms, which will not be described in detail herein again.

S304: determining the target score of each initial music beat according to the first score, the second score and the third score.

Specifically, for each initial music beat, the target score of the initial music beat is determined according to the first score, the second score and the third score of the initial music beat.

In some embodiments, the target score can be determined by the following Equation 6:

$$Cost = Cost\_d + w\_s * Cost\_s + w\_p * Cost\_p; \quad \text{Equation 6}$$

where Cost is the target score, and w_s, w_p are the preset weights respectively. Optionally, w_s and w_p may be the same or different. In practice, the specific value of is determined according to many tests and experience.

Optionally, the target score of the initial music beat can be determined by other algorithms according to the first score, the second score and the third score of the initial music beat, which will not be described in detail herein again.

S305: deleting an initial music beat with the target score less than a second preset value to obtain a remaining third music beat.

S306: according to time of the third music beat in the audio information, redetermining a target score of each third music beat again, and determining the target music beat according to the target score of the third music beat.

It should be noted that the method of redetermining the target score of each third music beat and determining the target music beat according to the target score of the third music beat is similar to the above-mentioned methods of S301~S305, and the details are not repeated herein again.

For example, the number of target music beats is equal to the difference between M and 1.

In the method provided in the embodiment of FIG. 3, the third duration is determined according to the total duration of audio information and the number of video objects, and the absolute value of the difference between the second duration and the third duration is determined as the first score of the initial music beat, which can avoid the situation that the switching interval of video objects is too short or too long, so that when the rendering effect is added to the video to be processed, the vision and the hearing can be perfectly combined and the user experience can be improved. Further, the fourth score obtained by Equation 3 can avoid frequent switching at the starting time of audio information; the fifth score obtained by Equation 4 can avoid frequent switching at the ending time of the audio information, so that the processed video can be more beautiful and can be easy to perceive when adding rendering effect to the video to be processed.

Figure 4:
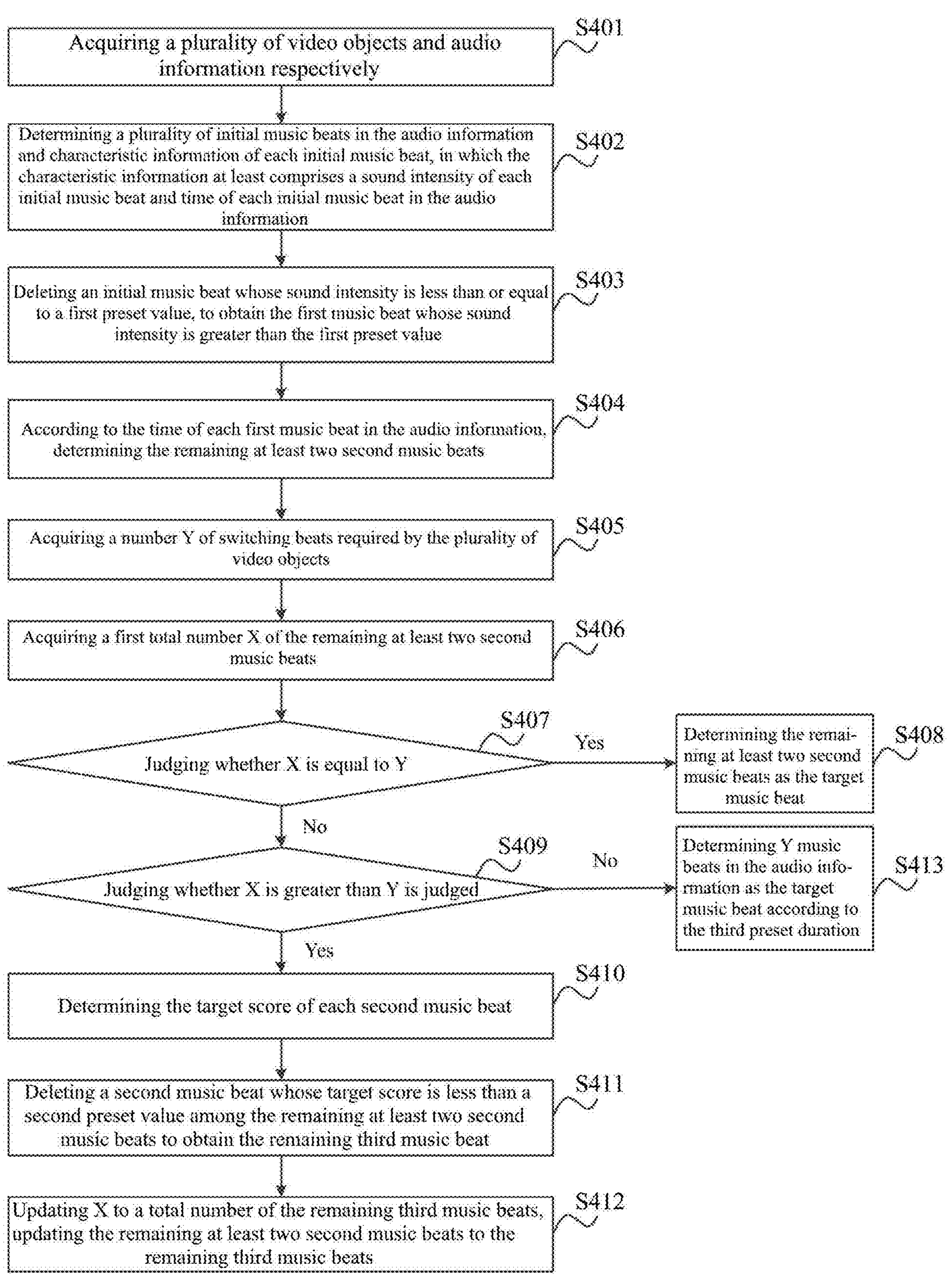
FIG. 4 is a second flowchart of the method for determining the target music beat provided by the present disclosure.

The present disclosure also provides a method for determining the target music, specifically, please refer to FIG. 4.

FIG. 4 is the second flowchart of the method for determining the target music beat provided by the present disclosure. As shown in FIG. 4, the method includes:

S401: acquiring a plurality of video objects and audio information respectively.

Optionally, the execution method of S401 is the same as that of S201, and the execution process of S401 is not described here.

S402: determining a plurality of initial music beats in the audio information and characteristic information of each initial music beat, in which the characteristic information at least comprises a sound intensity of each initial music beat and time of each initial music beat in the audio information.

Optionally, the execution method of S402 is the same as that of S202, and the execution process of S402 is not described here.

S403: deleting an initial music beat whose sound intensity is less than or equal to a first preset value, to obtain the first music beat whose sound intensity is greater than the first preset value.

Optionally, judging whether there is an initial music beat with sound intensity less than or equal to the first preset value among the plurality of initial music beats; i yes, deleting the initial music beats with sound intensity less than or equal to the first preset value from the plurality of initial music beats to obtain the first music beat with sound intensity greater than the first preset value.

Optionally, it can also be judged whether the sound intensity of each initial music beat is greater than the first preset value, so as to obtain the first music beat with a sound intensity greater than the first preset value.

S404: according to the time of each first music beat in the audio information, determining the remaining at least two second music beats.

Optionally, for any two adjacent first music beats, according to the time corresponding to the first music beats, the first duration between the two adjacent first music beats is obtained; if the first duration is less than the first preset duration, the first music beat with low priority among two adjacent first music beats is deleted to obtain at least two remaining second music beats. Specifically, please refer to the method of obtaining the remaining at least two second music beats in the above-mentioned mode 112, which will not be described herein again.

Optionally, among the remaining at least two second music beats, there may still be a second music beat whose first duration between two adjacent second music beats is less than the first preset duration, so it is necessary to delete the second music beat with low priority among the remaining at least two second music beats again and get the remaining second music beats again.

S405: acquiring a number Y of switching beats required by the plurality of video objects.

Optionally, that number of switching beats is equal to the number of video objects minus 1. For example, the number of video objects is equal to the total number of the plurality of video objects.

Optionally, the number of switching beats can also be equal to the number determined according to the user's setting operation.

In the present disclosure, the number of switching beats is determined according to the user's setting operation, so that the user can flexibly set the number of rendering effects and improve the flexibility of increasing the number of rendering effects in the video to be processed.

S406: acquiring a first total number X of the remaining at least two second music beats.

S407: judging whether X is equal to Y.

If yes, S408 is executed, otherwise S409 is executed.

S408: determining the remaining at least two second music beats as the target music beat.

S409, judging whether X is greater than Y is judged.

If yes, S410~S412 are executed, otherwise S413 is executed.

S410: determining the target score of each second music beat.

The method for determining the target score of each second music beat is similar to the method shown in S301~S304 above, and will not be repeated herein again.

S411: deleting a second music beat whose target score is less than a second preset value among the remaining at least two second music beats to obtain the remaining third music beat.

S412: updating X to a total number of the remaining third music beats, updating the remaining at least two second music beats to the remaining third music beats, and performing S407 again until X is equal to Y.

S413: determining Y music beats in the audio information as the target music beat according to the third preset duration.

A time interval between the corresponding times of two adjacent music beats in the Y music beats in the audio information is equal to the third preset duration.

Optionally, from the preset time, one music beat is acquired every third preset time to obtain Y music beats. For example, the preset time can be a time after the start time, and the difference between the preset time and the start time is equal to the second preset time.

Figure 5:
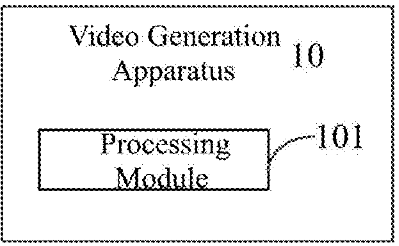
FIG. 5 is a schematic diagram of a video generation apparatus based on music beats provided by the present disclosure.

FIG. 5 is a schematic diagram of a video generation apparatus based on music beats provided by the present disclosure. As shown in FIG. 5, the video generation apparatus 10 includes a processing module 101. The processing module 101 is configured to:

- acquire a plurality of video objects and audio information respectively;
- determine a plurality of initial music beats in the audio information and characteristic information of each initial music beat, wherein the characteristic information at least comprises a sound intensity of each initial music beat and time of each initial music beat in the audio information;
- according to the characteristic information, select a target music beat from the plurality of initial music beats; and
- generate a target video according to the target music beat and the plurality of video objects.

The video generation apparatus 10 provided by the present disclosure can execute the above-mentioned video generation method, and its implementation principle and beneficial effects are similar, which will not be repeated herein again.

In some embodiments, the processing module 101 is specifically used for judging whether the sound intensity of each initial music beat is greater than a first preset value; determining the target music beat according to a first music beat whose sound intensity is greater than the first preset value.

In some embodiments, the processing module 101 is specifically used for: for any two adjacent first music beats, acquiring a first duration between the two adjacent first music beats according to time corresponding to the first music beat; if the first duration is less than a first preset duration, deleting a first music beat with a low priority among the two adjacent first music beats to obtain remaining at least two second music beats; and determining the target music beat according to the at least two second music beats.

In some embodiments, the plurality of initial music beats comprise at least two music beats of the following: a downbeat beat, a voice beat, a music phrase beat, a music paragraph beat, a sound effect beat and a chorus beat.

In some embodiments, the deleting a first music beat with a low priority among the two adjacent first music beats comprises: according to a preset priority order, deleting the first music beat with the low priority among the two adjacent first music beats; the preset priority order from top to bottom is a chorus beat, a strong sound beat, a music phrase beat, a music paragraph beat, a downbeat beat, a weak sound beat, a voice beat and a preset beat.

In some embodiments, the processing module 101 is specifically used for: determining a target score of each initial music beat according to the time of each initial music beat in the audio information; and determining the target music beat according to the target score of each initial music beat.

In some embodiments, the processing module 101 is specifically used for: deleting an initial music beat with the target score less than a second preset value to obtain a remaining third music beat; and according to time of the third music beat in the audio information, determining a target score of each third music beat again, and determining the target music beat according to the target score of the third music beat.

In some embodiments, the processing module 101 is specifically used for: determining a second duration between two adjacent initial music beats according to the time of each initial music beat in the audio information, and determining a first score of each initial music beat according to the second duration; determining a second score of each initial music beat according to a weight of each initial music beat; determining a third score of each initial music beat according to the time of each initial music beat in the audio information and starting time and ending time of the audio information; determining the target score of each initial music beat according to the first score, the second score and the third score.

In some embodiments, the processing module 101 is specifically used for: determining a third duration according to a total duration of the audio information and a number of the plurality of video objects; determining an absolute value of a difference between the second duration and the third duration as the first score.

In some embodiments, the processing module 101 is specifically used for: determining a fourth score according to the time of each initial music beat in the audio information, the starting time of the audio information and a second preset duration; determining a fifth score according to the time of each initial music beat in the audio information, the ending time of the audio information and the second preset duration; determining the third score according to the fourth score and the fifth score.

In some embodiments, the processing module 101 is further used for: according to a preset priority order, setting a corresponding weight for each initial music beat; the weight is at least partially related to a priority of the music beat.

In some embodiments, the processing module 101 is specifically used for: adding the audio information to an audio track of the plurality of video objects to obtain a video to be processed; in the video to be processed, adding a rendering effect to a video object corresponding to time where the target music beat is located to obtain the target video, wherein the rendering effect is an animation, an effect or a transition.

In some embodiments, the processing module 101 is specifically used for: inputting the audio information into an audio characteristic analysis model to obtain the plurality of initial music beats in the audio information and the characteristic information of each initial music beat.

The video generation apparatus 10 provided by the present disclosure can execute the above-mentioned video generation method, and its implementation principle and beneficial effects are similar, which will not be repeated herein again.

Figure 6:
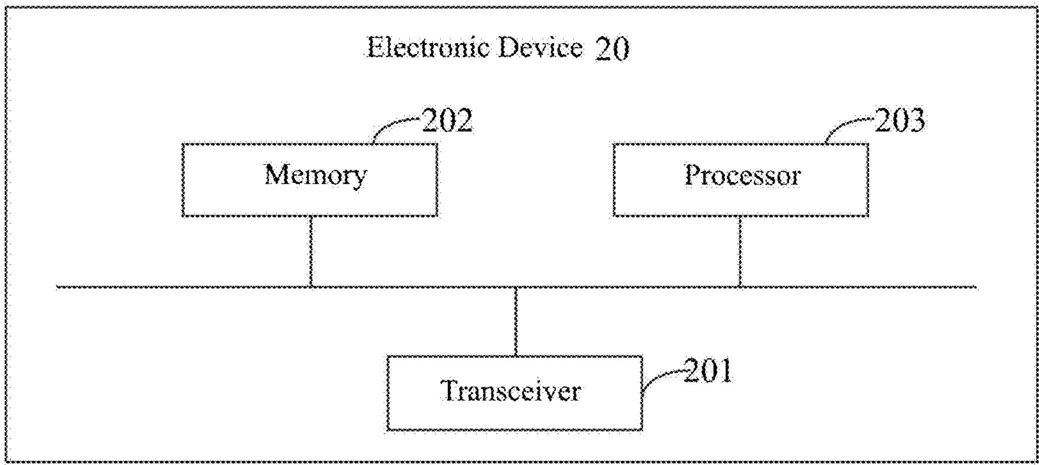
FIG. 6 is a hardware schematic diagram of an electronic device provided by the present disclosure.

FIG. 6 is a hardware schematic diagram of an electronic device provided by the present disclosure. As shown in FIG. 6, the electronic device 20 may include a transceiver 201, a memory 202 and a processor 203.

The transceiver 201 may include a transmitter and/or a receiver. A transmitter can also be called a transmitter, a sender, a transmission port or a transmission interface and the like. A receiver can also be called a receiver, a receiving machine, a receiving port or a receiving interface and the like.

Illustratively, the transceiver 201, the memory 202, and the processor 203 are interconnected by a bus.

The memory 202 is used to store computer-executed instructions.

The processor 203 is used to execute the computer-executed instructions stored in the memory 202, so that the processor 203 executes the above video generation method.

The present disclosure provides a computer-readable storage medium in which computer-executable instructions are stored, and when the computer-executable instructions are executed by a processor, the above video generation method is realized.

The present disclosure also provides a computer program product, including a computer program, and the computer program, when executed by a processor, can realize the above video generation method.

The present disclosure also provides a computer program, and the computer program, when executed by a processor, can realize the above video generation method.

All or part of the steps to realize the above method embodiments can be completed by hardware related to program instructions. The aforementioned program can be stored in a readable memory. When the program is executed, the steps including the above method embodiments are executed; the aforementioned memory (storage medium) includes read-only memory (ROM), random access memory (RAM), flash memory, hard disk, solid state hard disk, magnetic tape, floppy disk, optical disc and any combination thereof.

The present disclosure is described with reference to flowcharts and/or block diagrams of methods, devices (systems), and computer program products according to the present disclosure. It should be understood that each flow and/or block in the flowchart and/or block diagram, and combinations of the flow and/or block in the flowchart and/or block diagram can be implemented by computer program instructions. These computer program instructions may be provided to the processing unit of a general-purpose computer, a special-purpose computer, an embedded processor or other programmable data processing apparatus to produce a machine, such that the instructions executed by the processing unit of the computer or other programmable data processing apparatus produce means for implementing the functions specified in the flowchart flow or flows and/or block or blocks in the block diagram.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified in one or more flow charts and/or block diagrams.

These computer program instructions may also be loaded onto a computer or other programmable data processing apparatus, such that a series of operational steps are performed on the computer or other programmable apparatus to produce a computer-implemented process, such that the instructions executed on the computer or other programmable apparatus provide steps for implementing the functions specified in the flowchart flow or flows and/or block or blocks of the block diagram.

Obviously, those skilled in the art can make various modifications and variations to the present disclosure without departing from its spirit and scope. Thus, if these modifications and variations of the present disclosure are within the scope of the claims of the present disclosure and their equivalents, the present disclosure is also intended to include these modifications and variations.

In the present disclosure, the term "including" and its variants may refer to including without limitation; the term "or" and its variants may refer to "and/or". The terms "first", "second" and so on in the present disclosure are used to distinguish similar objects, and are not necessarily used to describe a specific order or precedence. In the present disclosure, "a plurality of" means two or more. "and/or", which describes the relationship of related objects, means that there can be three kinds of relationships, for example, A and/or B, which can mean that A exists alone, A and B exist together, and B exists alone. The character "/" generally indicates that the context object is an OR relationship.

Other embodiments of the present disclosure will easily occur to those skilled in the art after considering the specification and practicing the present disclosure disclosed herein. The present disclosure is intended to cover any variations, uses or adaptations of the present disclosure, which follow the general principles of the present disclosure and include common sense or common technical means in this technical field that are not disclosed in the present disclosure. The specification and examples are to be regarded as exemplary only, with a true scope and spirit of the present disclosure indicated by the following claims.

It should be understood that the present disclosure is not limited to the precise structure described above and shown in the drawings, and various modifications and changes can be made without departing from its scope. The scope of the present disclosure is limited only by the appended claims.

The invention claimed is:

1. A video generation method based on music beats, comprising:

acquiring a plurality of video objects and audio information respectively;

determining a plurality of initial music beats in the audio information and characteristic information of each initial music beat, wherein the characteristic information at least comprises a sound intensity of each initial music beat and time of each initial music beat in the audio information;

determining a score of each initial music beat among the plurality of initial music beats based on a duration between two adjacent initial music beats according to the time of each initial music beat in the audio information and a preset weight of each initial music beat;

selecting a music beat from the plurality of initial music beats based on the scores of the plurality of initial music beats; and generating a video by adding a rendering effect to one of the plurality of video objects corresponding to time where the selected music beat is located, wherein the rendering effect comprises an animation, an effect, or a transition.

2. The method according to claim 1, wherein the selecting the music beat from the plurality of initial music beats comprises:

judging whether the sound intensity of each initial music beat is greater than a first preset value;

determining the music beat according to a first music beat whose sound intensity is greater than the first preset value.

3. The method according to claim 2, wherein the determining the music beat according to a first music beat whose sound intensity is greater than the first preset value comprises:

for any two adjacent first music beats, acquiring a first duration between the two adjacent first music beats according to time corresponding to the first music beat;

if the first duration is less than a first preset duration, deleting a first music beat with a low priority among the two adjacent first music beats to obtain remaining at least two second music beats; and determining the music beat according to the at least two second music beats.

4. The method according to claim 1, wherein the plurality of initial music beats comprise at least two music beats of the following: a downbeat beat, a voice beat, a music phrase beat, a music paragraph beat, a sound effect beat and a chorus beat.

5. The method according to claim 3, wherein the deleting a first music beat with a low priority among the two adjacent first music beats comprises:

according to a preset priority order, deleting the first music beat with the low priority among the two adjacent first music beats;

wherein the preset priority order from top to bottom is a chorus beat, a strong sound beat, a music phrase beat, a music paragraph beat, a downbeat beat, a weak sound beat, a voice beat and a preset beat.

6. The method according to claim 1, wherein the determining the score of each initial music beat comprises:

determining the score of each initial music beat according to the time of each initial music beat in the audio information.

7. The method according to claim 1, wherein the method further comprises:

deleting an initial music beat with the score less than a second preset value to obtain a remaining third music beat; and according to time of the third music beat in the audio information, redetermining a score of each third music beat, and determining the music beat according to the score of the third music beat.

8. The method according to claim 6, wherein the determining the score of each initial music beat according to the time of each initial music beat in the audio information comprises:

determining the duration between the two adjacent initial music beats according to the time of each initial music beat in the audio information, and determining a first score of each initial music beat according to the duration;

determining a second score of each initial music beat according to the preset weight of each initial music beat;

determining a third score of each initial music beat according to the time of each initial music beat in the audio information and starting time and ending time of the audio information;

determining the score of each initial music beat according to the first score, the second score and the third score.

9. The method according to claim 8, wherein the determining the first score of each initial music beat according to the second duration comprises:

determining a third duration according to a total duration of the audio information and a number of the plurality of video objects;

determining an absolute value of a difference between the second duration and the third duration as the first score.

10. The method according to claim 8, wherein the determining the third score of each initial music beat according to the time of each initial music beat in the audio information and starting time and ending time of the audio information comprises:

determining a fourth score according to the time of each initial music beat in the audio information, the starting time of the audio information and a second preset duration;

determining a fifth score according to the time of each initial music beat in the audio information, the ending time of the audio information and the second preset duration;

determining the third score according to the fourth score and the fifth score.

11. The method according to claim 8, further comprising:

according to a preset priority order, setting a corresponding weight for each initial music beat, wherein the weight is at least partially related to a priority of the music beat.

12. The method according to claim 1, wherein generating the video comprises:

adding the audio information to an audio track of the plurality of video objects to obtain a video to be processed;

in the video to be processed, adding the rendering effect to the video object corresponding to the time where the selected music beat is located to obtain the video.

13. The method according to claim 1, wherein the determining a plurality of initial music beats in the audio information and characteristic information of each initial music beat comprises:

inputting the audio information into an audio characteristic analysis model to obtain the plurality of initial music beats in the audio information and the characteristic information of each initial music beat.

14. An electronic device, comprising: a processor and a memory communicatively connected to the processor;

wherein computer-executable instructions are stored on the memory;

the computer-executable instructions stored in the memory are executed by the processor, to perform operations, the operations comprising:

acquiring a plurality of video objects and audio information respectively;

determining a score of each initial music beat among the plurality of initial music beats based on a duration between two adjacent initial music beats according to the time of each initial music beat in the audio information and a preset weight of each initial music beat;

selecting a music beat from the plurality of initial music beats based on the scores of the plurality of initial music beats; and generating a video by adding a rendering effect to one of the plurality of video objects corresponding to time where the selected music beat is located, wherein the rendering effect comprises an animation, an effect, or a transition.

15. A non-transient computer-readable storage medium, storing computer-executable instructions thereon, wherein the computer-executable instructions, when executed by a processor, perform operations, the operations comprising:

acquiring a plurality of video objects and audio information respectively;

determining a plurality of initial music beats in the audio information and characteristic information of each initial music beat, wherein the characteristic information at least comprises a sound intensity of each initial music beat and time of each initial music beat in the audio information;

determining a score of each initial music beat among the plurality of initial music beats based on a duration between two adjacent initial music beats according to the time of each initial music beat in the audio information and a preset weight of each initial music beat;

selecting a music beat from the plurality of initial music beats based on the scores of the plurality of initial music beats; and generating a video by adding a rendering effect to one of the plurality of video objects corresponding to time where the selected music beat is located, wherein the rendering effect comprises an animation, an effect, or a transition.

16. The electronic device according to claim 14, wherein the selecting the music beat from the plurality of initial music beats comprises:

judging whether the sound intensity of each initial music beat is greater than a first preset value;

determining the music beat according to a first music beat whose sound intensity is greater than the first preset value.

17. The electronic device according to claim 16, wherein the determining the music beat according to a first music beat whose sound intensity is greater than the first preset value comprises:

for any two adjacent first music beats, acquiring a first duration between the two adjacent first music beats according to time corresponding to the first music beat;

if the first duration is less than a first preset duration, deleting a first music beat with a low priority among the two adjacent first music beats to obtain remaining at least two second music beats; and determining the music beat according to the at least two second music beats.

18. The electronic device according to claim 14, wherein the plurality of initial music beats comprise at least two music beats of the following: a downbeat beat, a voice beat, a music phrase beat, a music paragraph beat, a sound effect beat and a chorus beat.

19. The electronic device according to claim 17, wherein the deleting a first music beat with a low priority among the two adjacent first music beats comprises:

according to a preset priority order, deleting the first music beat with the low priority among the two adjacent first music beats;

wherein the preset priority order from top to bottom is a chorus beat, a strong sound beat, a music phrase beat, a music paragraph beat, a downbeat beat, a weak sound beat, a voice beat and a preset beat.

20. The electronic device according to claim 14, wherein the determining the score of each initial music beat comprises:

determining the score of each initial music beat according to the time of each initial music beat in the audio information.

* * * * *